United States Patent
Chandy et al.

[19]

[11] Patent Number: 6,039,144
[45] Date of Patent: Mar. 21, 2000

[54] APPARATUS AND METHOD FOR PRODUCING A DESIRED RETURN TORQUE IN A VEHICLE POWER STEERING SYSTEM HAVING A ROTATIONAL STEERING POSITION SENSOR

[75] Inventors: Ashok Chandy, Fenton; Kathryn Lynn Pattok, Saginaw; Deepak Chhaya, Canton, all of Mich.

[73] Assignee: General Motors Corporation, Detroit, Mich.

[21] Appl. No.: 09/103,602

[22] Filed: Jun. 24, 1998

[51] Int. Cl.$^7$ .................................................. B62D 5/04
[52] U.S. Cl. ............................................ 180/446; 701/42
[58] Field of Search .................................. 180/443, 446; 701/41, 42

[56] References Cited

U.S. PATENT DOCUMENTS

| | | | |
|---|---|---|---|
| 4,664,211 | 5/1987 | Oshita et al. | 180/446 |
| 4,842,088 | 6/1989 | Oshita et al. | 180/446 |
| 4,979,114 | 12/1990 | Oshita et al. | 701/41 |
| 5,053,966 | 10/1991 | Takahashi et al. | 701/41 |

*Primary Examiner*—Kevin Hurley
*Attorney, Agent, or Firm*—Edmund P. Anderson

[57] ABSTRACT

A vehicle power steering system has a steering shaft with a rotational position sensor providing signal rollover so that each sensor output indicates a plurality of potential absolute steering positions separated from each other by multiples of a rollover angle. Upon each initiation of vehicle operation, the system selects an absolute steering positions corresponding to an initial sensor output as an unadjusted steering position and repeatedly updates the unadjusted steering position in response to sensor output changes, including sensed rollover events. The system stores data dividing a two dimensional map of possible vehicle steering operating points defined by total steering torque and steering position into a first region of likely vehicle steering system operating points, a second region of unlikely steering system operating points indicating a revolution offset in a first direction, and a third region of unlikely steering system operating points indicating a revolution offset in an opposite direction. While a minimum vehicle velocity and, optionally, other enabling conditions exist, a vehicle steering operating point derived from sensed total steering torque, the updated unadjusted steering position and a revolution offset compared with the stored data; and the revolution offset is updated as indicated if the derived vehicle steering system operating point is within the second or third stored regions of steering system operating points. A second return torque command is derived from the updated unadjusted steering position and updated revolution offset and provided to the actuator to produce a second return torque, preferably after the revolution offset is walked incrementally to the updated value, with return torque provided in a single, correct direction only during the walk.

18 Claims, 13 Drawing Sheets

APPARATUS AND METHOD FOR PRODUCING A DESIRED RETURN TORQUE IN A VEHICLE POWER STEERING SYSTEM HAVING A ROTATIONAL STEERING POSITION SENSOR

TECHNICAL FIELD

The technical field of this invention is the determination of a desired return torque in a vehicle electric power steering system having a total range of steering position greater than the output range of a rotational position sensor.

BACKGROUND OF THE INVENTION

Some vehicle power steering systems use an actuator coupled to the steering shaft to provide power assist in vehicle steering. It is often desirable in such systems to provide a return torque command to the actuator so as to help return the steering gear to a centered position and provide a stable steering feel to the vehicle operator. Such a return torque command is generated as a function of steering position as shown in the graph of FIG. 4, provided the steering position is known. Rotational position sensors having high resolution and other desirable characteristics may be coupled to the steering shaft to provide an output voltage varying in a substantially linear manner from a first voltage to a second voltage through a rollover angle comprising an entire 360 degree rotation or some sub-multiple thereof. But the steering shaft typically rotates through a plurality of such revolutions or sub-multiple angles, and therefore a plurality of repetitions of the rollover angle, as the rack is moved from one end to the other of its operational range. Thus, a sensor directly coupled to the steering shaft for maximum resolution in the output signal is similarly rotated through a plurality of repetitions of the output voltage range and produces a rollover transition at the end of each repetition when the voltage jumps from one extreme to the other. The output of a sensor so coupled does not by itself provide a unique absolute steering position; rather, it provides a set of steering positions separated by a rollover angle corresponding to the full output voltage range. It is thus necessary, in order to know the absolute rotational position, to compensate the sensor output signal for such rollover transitions. But an offset parameter must also generally be generated every time a new vehicle ignition cycle is initiated, since the sensor may have been rotated into a different range of its output when the ignition was off, with no rollover transition being sensed.

When operation of a vehicle with such a steering system is initiated, it is not known for certain whether the steering position is right or left of center; and provision of return torque in the wrong direction could create just the opposite effect from that desired. It is therefor desirable to determine the steering system's absolute rotational position with some degree of confidence before applying full return torque. In addition, once the absolute steering position is known, it is preferable to phase in the return torque in a gradual, controlled manner that is not objectionable to the vehicle operator.

SUMMARY OF THE INVENTION

The method and apparatus of this invention determines an absolute steering position and return torque for a vehicle power steering system having a steering shaft with a rotational position sensor providing signal rollover so that each sensor output indicates a plurality of potential absolute steering positions separated from each other by multiples of a rollover angle. The method and apparatus derives a return torque command from an absolute steering position signal derived from the sensor output by comparing certain dynamic vehicle steering parameters with stored data to determine a likely revolution offset relating the sensor output signal to an absolute steering position from which a return torque command may be derived.

The method is performed by the apparatus upon each initiation of vehicle operation and begins by selecting, as an unadjusted steering position, one of the plurality of potential steering positions corresponding to an initial sensor output. This unadjusted steering position is repeatedly updated in response to output changes of the rotational position sensor, including sensed rollover transitions, so that it spans the full range of steering position, although it may be incorrect by a revolution offset which is an integer multiple of the rollover angle. For a predetermined range of vehicle velocities above and including a minimum vehicle velocity, and for a two dimensional range of possible vehicle steering operating points defined by total steering torque and steering position, data are stored defining a first region of likely vehicle steering system operating points, a second region of unlikely steering system operating points indicating a revolution offset in a first direction, and a third region of unlikely steering system operating points indicating a revolution offset in an opposite direction.

The vehicle power steering system has an actuator coupled to the steering shaft for the provision of a return torque. Until vehicle velocity first equals a minimum vehicle velocity a first return torque command is provided to the actuator to produce a predetermined first return torque. When vehicle velocity equals the minimum vehicle velocity for at least a predetermined time, the total steering torque is sensed; and a vehicle steering operating point is derived from the sensed total steering torque, the updated unadjusted steering position and a revolution offset. This derived vehicle steering operating point is compared with the stored data; and the revolution offset is updated as indicated if the derived vehicle steering system operating point is within the second stored region or the third stored region of steering system operating points. A second return torque command is derived from the updated unadjusted steering position and the updated revolution offset and provided to the actuator to produce a second return torque.

To avoid a sudden increase in return torque when the revolution offset is updated, a temporary revolution offset is preferably walked incrementally toward the updated revolution offset, with return torque derived from the temporary revolution offset so changed in combination with the updated unadjusted steering position as long as the derived return torque is in the correct centering direction, until either (1) the temporary revolution offset arrives within a first predetermined small distance of the updated revolution offset, or (2) when a true absolute steering position, derived from the updated revolution offset in combination with the updated unadjusted position, arrives within a second predetermined small distance of the center position, whichever occurs first.

DESCRIPTION OF THE PREFERRED EMBODIMENT

Figure 1:
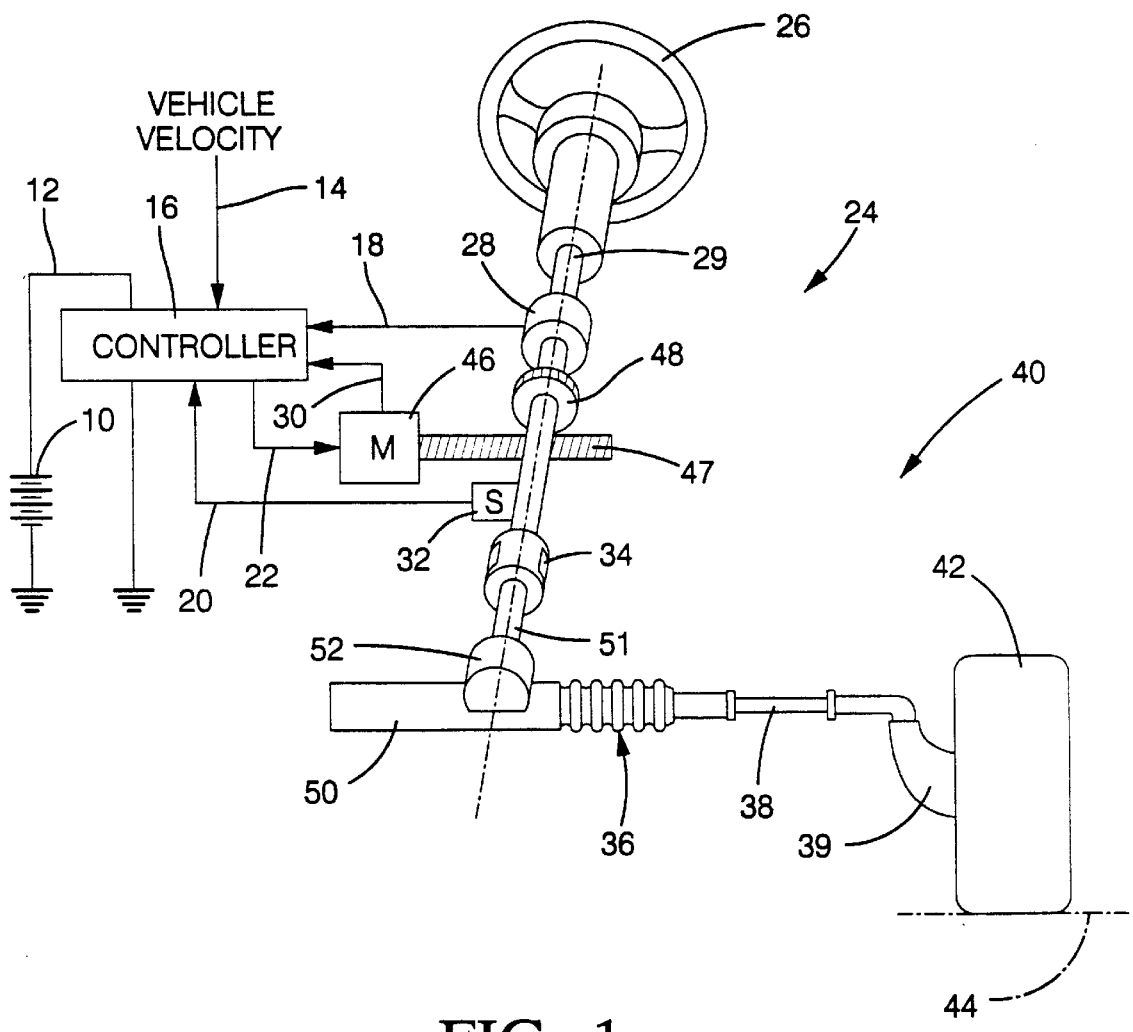
FIG. 1 shows a vehicle power steering system which provides an environment for the apparatus of this invention.
Figure 2:
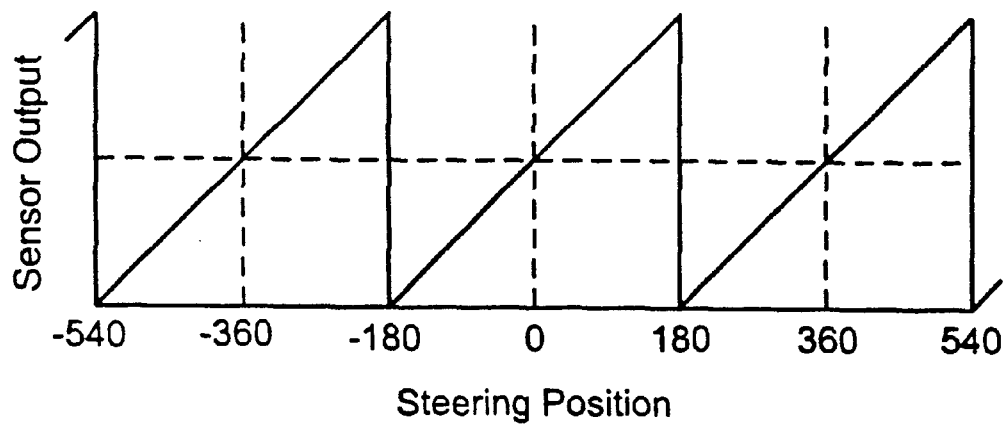
FIG. 2 is a graphical representation of the output signal of a rotational position sensor with a rollover output signal used as a steering angle sensor in the power steering system of FIG. 1.

Referring to FIG. 1, a motor vehicle 40 is provided with a power steering system 24, which in this embodiment is an electric power steering system. Power steering system 24 may comprise a conventional rack and pinion steering mechanism 36, which includes a toothed rack 50 and a pinion gear (not shown) under gear housing 52. As a hand wheel 26 is turned by a vehicle operator, an upper steering shaft 29 turns a lower shaft 51 through a universal joint 34; and lower steering shaft 51 turns the pinion gear. Rotation of the pinion gear moves the rack, which moves the tie rods 38 (only one shown), which move steering knuckles 39 (only one shown) to turn steering wheels 42 (only one shown).

Power assist is provided through a controller 16 and a power assist actuator comprising an electric motor 46. Controller 16 receives electric power from a vehicle electric power source 10 through a line 12, a signal representative of the vehicle velocity on line 14, and steering pinion gear angle signal from a rotational position sensor 32 on line 20. As hand wheel 26 is turned, a torque sensor 28 senses the torque applied to hand wheel 26 by the vehicle operator and provides a hand wheel torque signal to controller 16 on line 18. In addition, as the rotor of motor 46 turns, rotor position signals for each phase are generated within motor 46 and provided over bus 30 to controller 16. In response to the vehicle velocity, operator torque, steering pinion gear angle and rotor position signals received, controller 16 derives desired motor currents and provides such currents through a bus 22 to motor 46, which supplies torque assist to steering shaft 29, 51 through worm 47 and worm gear 48. If torque sensor 28 is the type which requires upper steering shaft 29 to be separated at the sensor between upper and lower sections allowing some range of rotational independence, both rotational position sensor 32 and worm gear 48 are associated with the lower section of the steering shaft, below torque sensor 28 as shown.

Rack 50 and its associated pinion gear of steering system 24 have a center position, in which steering wheels 42 are directed straight ahead relative to vehicle 40. It is an object of power steering system 24 to provide a return torque that assists in returning the steering system to a center position from either side thereof and provides the vehicle operator with a stable steering response and feel. In power steering system 24, this return torque is generated by electric motor 46; and a return torque component of the total desired torque signal is generated in controller 16. The desired return torque is typically programmed into control 16 as a function of the absolute steering position: that is, the deviation in both directions from center of rack 50 and the pinion gear. Thus, an accurate signal of steering position must be derived from rotational position sensor 32.

Sensor 32 is preferably a rotational position sensor which provides an output voltage corresponding to rotational angle through a complete revolution of lower steering shaft 51, and thus of the pinion gear. For purposes of this description, it will be assumed that lower steering shaft 51, the rotating portion of sensor 32 and the pinion gear rotate together, as a unit, through the same rotational angle, to control the direction of steering wheels 42. But it is typical in vehicle steering systems that full rack movement of the steering system 24 may require three to five full turns of steering shaft 51 and the pinion gear, and thus of the rotatable portion of sensor 32. In this embodiment, sensor 32 is thus set up to provide a unique, continuously varying voltage between rotational positions 180 degrees to the left and right of the center position, at which point the voltage jumps or "rolls over" to repeat the variation with further rotation in the same direction. In other embodiments, sensor 32 may be set up to provide the unique, continuously varying voltage over only half (180 degrees) or some other fraction of one full rotation, thus producing an even greater number of rollover events over the full range of rack movement. Thus, the output signal of sensor 32 by itself is ambiguous in that a given output voltage may correspond to a plurality of rack or steering positions, only one of which is correct.

In order to express the full range of steering angles as the output of sensor 32 changes, the apparatus of this invention performs an algorithm in controller 16, which may be embodied in a programmed digital computer or a custom digital processor. The algorithm is described with reference to the flow charts of FIG. 5–7 and 10–11, together with the graphs of FIG. 2–4 and 8–9.

Figure 3:
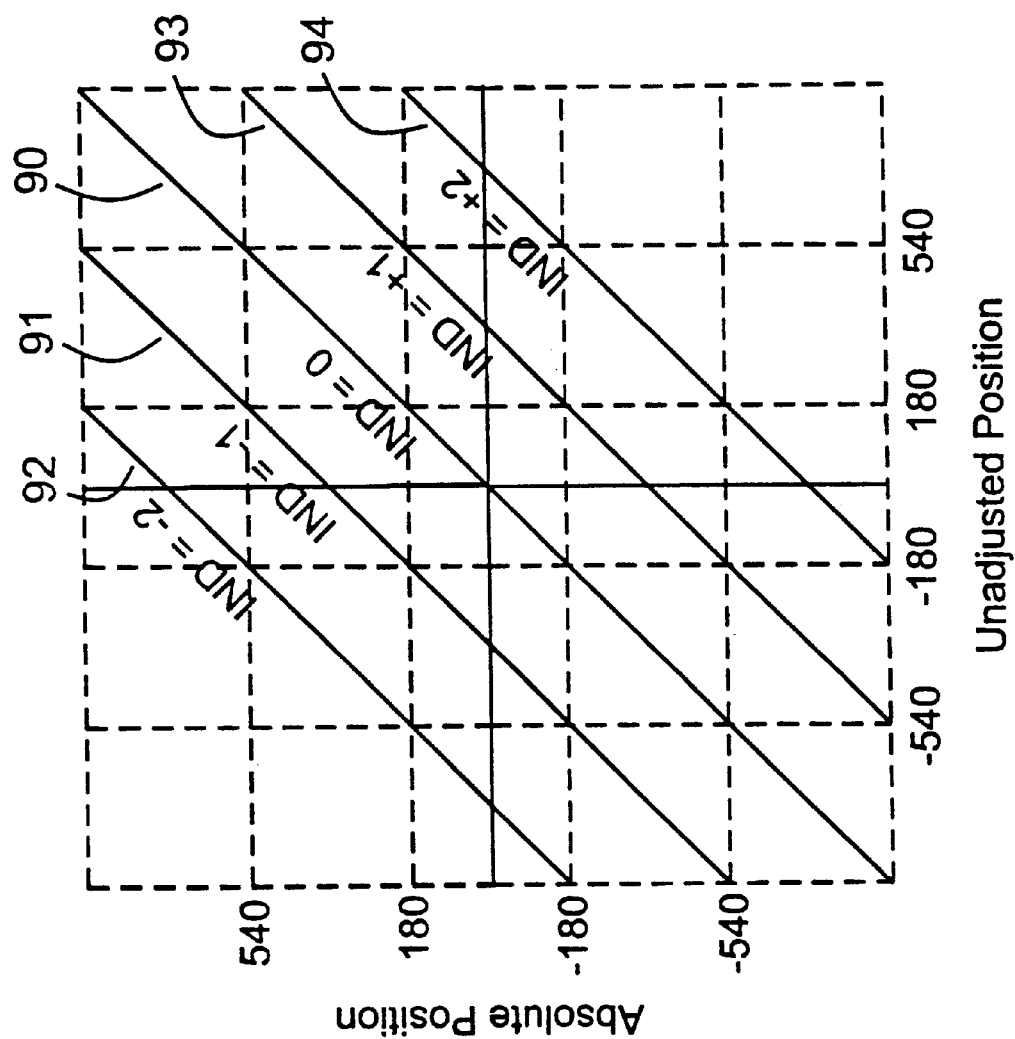
FIG. 3 shows a graphical representation of the output signal of FIG. 3 with rollover compensation applied.
Figure 5:
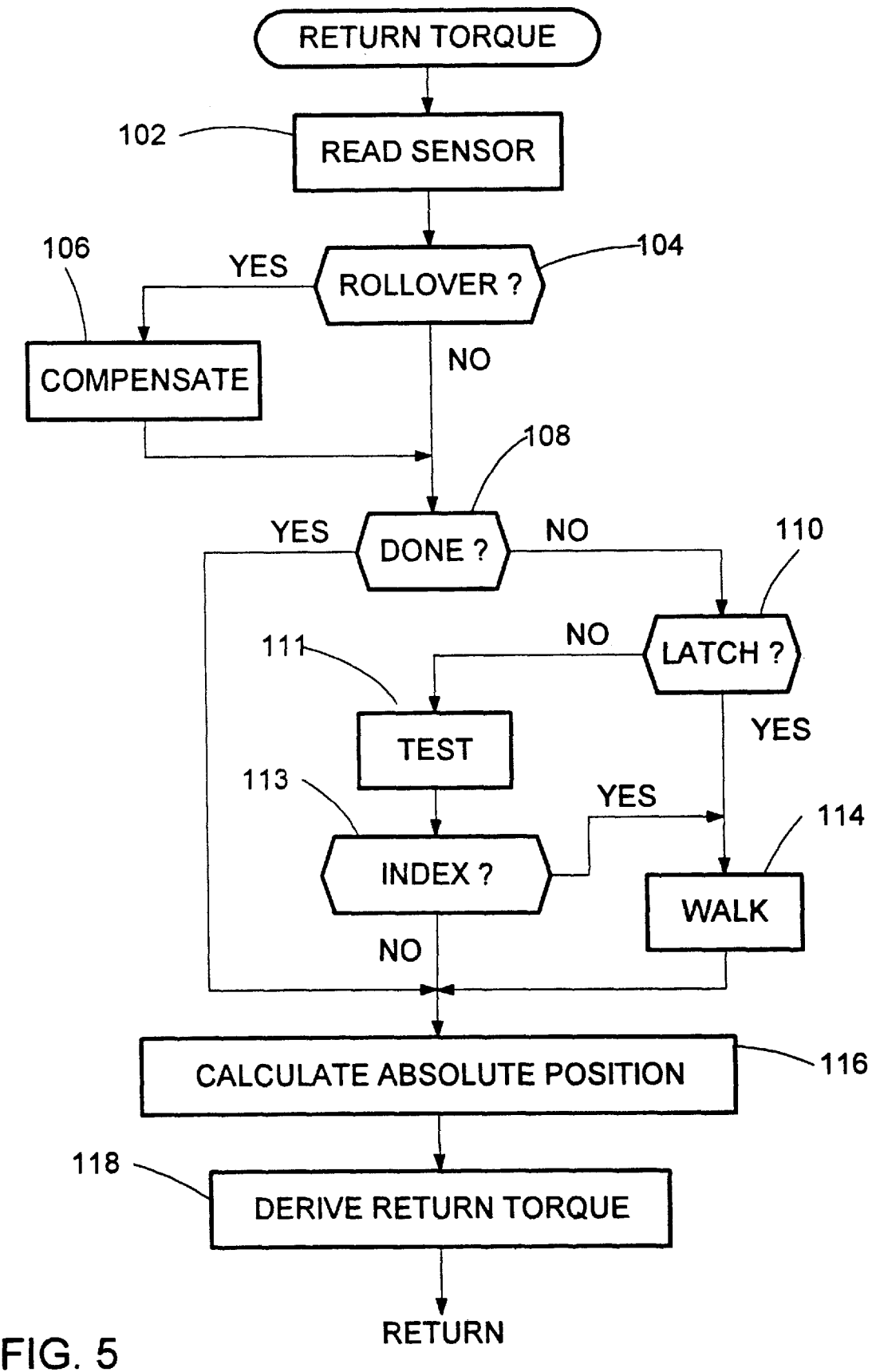
FIG. 5 shows a flow chart of a routine RETURN TORQUE comprising part of an embodiment of the method and apparatus of this invention.

Beginning with FIG. 5, routine RETURN TORQUE begins by reading and storing the sensor output at 102. The sensor output is a voltage, which is converted into a digital word by A/D converter apparatus in controller 16. This digital word represents an angle as shown in FIG. 3, which shows a graphical representation of the output of sensor 32 over the full range of absolute steering position. The graph is horizontally divided into several sections of linearly increasing (from left to right) output over 360 rotational degrees, with the voltage output jumping between the highest and lowest values in a rollover transition between each two adjacent sections. The total rotational angle through which sensor 32 varies continuously before rolling over— 360 degrees in this embodiment—is referred to herein as the rollover angle. The center section of the graph is itself centered on zero degrees, so that it spans the range −180<θ<+180 degrees. For the initial sensor output reading, it is assumed that the value is on this center section of the graph.

Returning to FIG. 5, the sensor output is tested for rollover at 104; and, if required, rollover compensation is performed at 106. A rollover transition can be detected by comparing the present sensor output with a previous sensor output to detect when the value jumps between the extremes of its range. Rollover compensation provides a step increase of +360 degrees, in this embodiment, when an increasing sensor output rolls over from +180 to −180 degrees (corresponding to a rollover transition from its maximum voltage to its minimum voltage) and a similar but opposite step increase of −360 degrees when a decreasing sensor output rolls over from 180 to +180 degrees. An additional rollover transition in the same direction provides an additional 360 degree rollover compensating step change. The result is a full scale output as shown in the center line 90 of FIG. 3. But this adoption of the center line 90 of FIG. 3 is only assumed for testing purposes; the true full scale output might be this or any one of some additional lines, all of which are parallel and each of which is separated from the nearest others by the rollover angle of 360 degrees. In this embodiment, additional lines 91 and 92 are shown 360 degrees and 720 degrees, respectively, to the left of line 90; and lines 93 and 94 are shown 360 degrees and 720 degrees, respectively, to the right of line 90. Additional lines are also possible, particularly if the rollover angle of steering position sensor 23 is a sub-multiple of 360 degrees. Thus, the assumed value on the center line is referred to herein as the Unadjusted Position; and the true, Absolute Position is given by the following equation:

Absolute Position=Unadjusted Position−Revolution Offset.

The true value of Revolution Offset is zero or some multiple of the rollover angle–360 degrees in this embodiment—and may be expressed in terms of a Revolution Index (e.g., +2, +1, 0, −1, −2) times the rollover angle. It should be emphasized that the Revolution Offset is not rollover compensation, which changes with every rollover of the sensor output signal. Rather, it relates the line of the true Absolute Position in the graph of FIG. 3 to the Unadjusted Position of center line 90 over the full range of rack movement and, when determined with certainty and phased in, will not change for the remainder of the ignition cycle.

Once the Unadjusted Position is determined at 104 or 106, a DONE flag is checked at 108 to see if a final value of Revolution Offset is to be used in the equation for Absolute Position. This will be the case only when the final (presumed true) value of Revolution Offset has been determined and fully phased in; and this process typically requires many cycles of the program. The DONE flag is thus initialized in a not set condition and will typically remain so for many cycles of the program.

If the DONE flag is found not set at 108, a LATCH flag is checked at 110. The LATCH flag will be set only after the final value of Revolution Offset has been determined and latched; and this flag also will be initialized as not set and likely remain so for a number of program cycles thereafter. Assuming the LATCH flag is not set, the program runs at step 111 a subroutine TEST. In this subroutine certain tests are performed to advance the determination of the final value of Revolution Offset and a temporary value of Revolution Offset or a usable Revolution Index is provided. Subroutine TEST will be described at a later point in this description.

When the program has returned from subroutine TEST, it is determined at 113 whether a usable Revolution Index has been found. If so, a subroutine WALK, to be described below, is called at 114 before Absolute Position is calculated at 116. If not, the routine proceeds directly to step 116. In either case, the Absolute Position is calculated according to the following equation:

Absolute Position=Unadjusted Position−Revolution Offset.

Once the Absolute Position is determined, a return torque may be derived therefrom at step 118:

Return Torque=$f$(Absolute Position).

Figure 4:
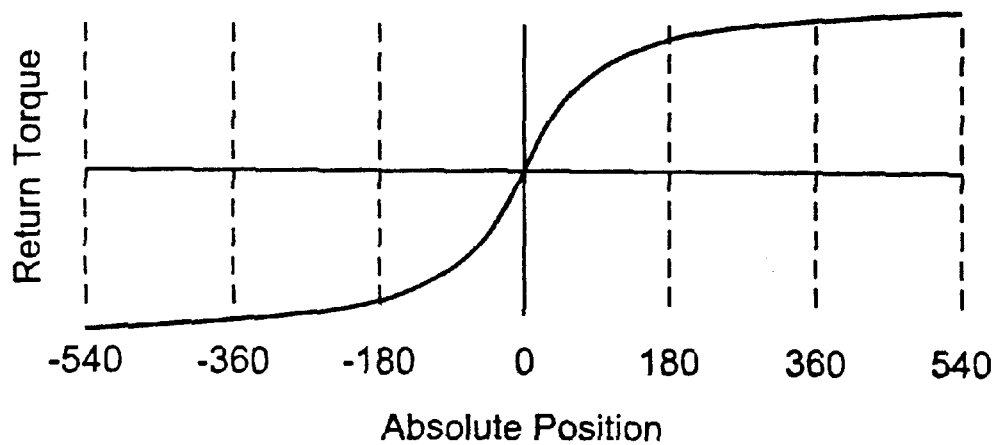
FIG. 4 is a graph of return torque as a function of absolute steering position in the power steering system of FIG. 1.

This function may be embodied in a look-up table containing values satisfying the relationship described in the curve of FIG. 4. Return torque is zero at Absolute Position =0 (center position) and increases in a return direction with movement away from that position. This return torque can be added to any other desired torque components into a total commanded torque signal in controller 16. It is also possible that return torque in one direction will be inhibited under some conditions, as will be explained later in this description.

Figure 6A:
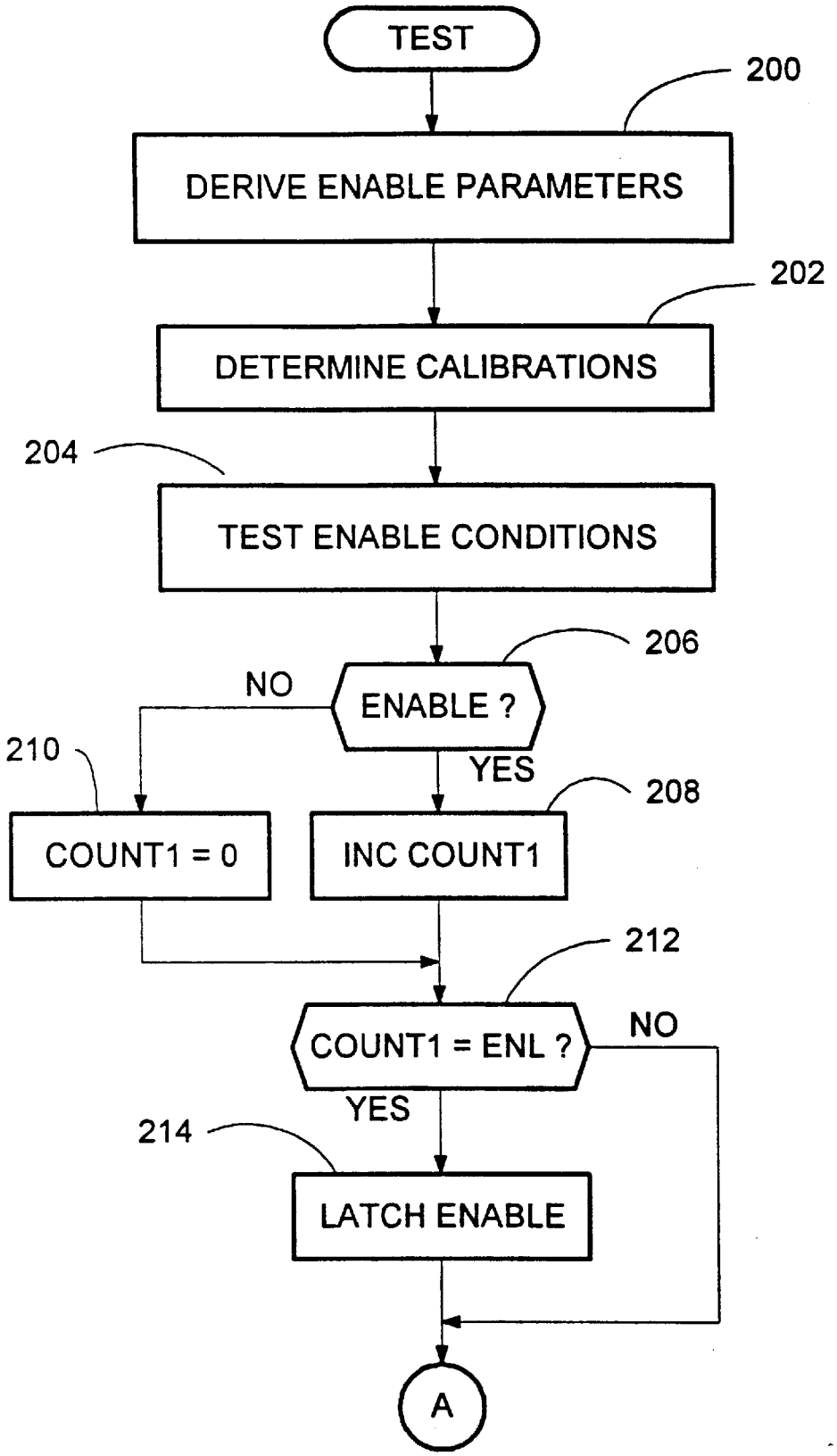
FIG. 6 shows a flow chart of a subroutine TEST comprising part of an embodiment of the method and apparatus of this invention.
Figure 6B:
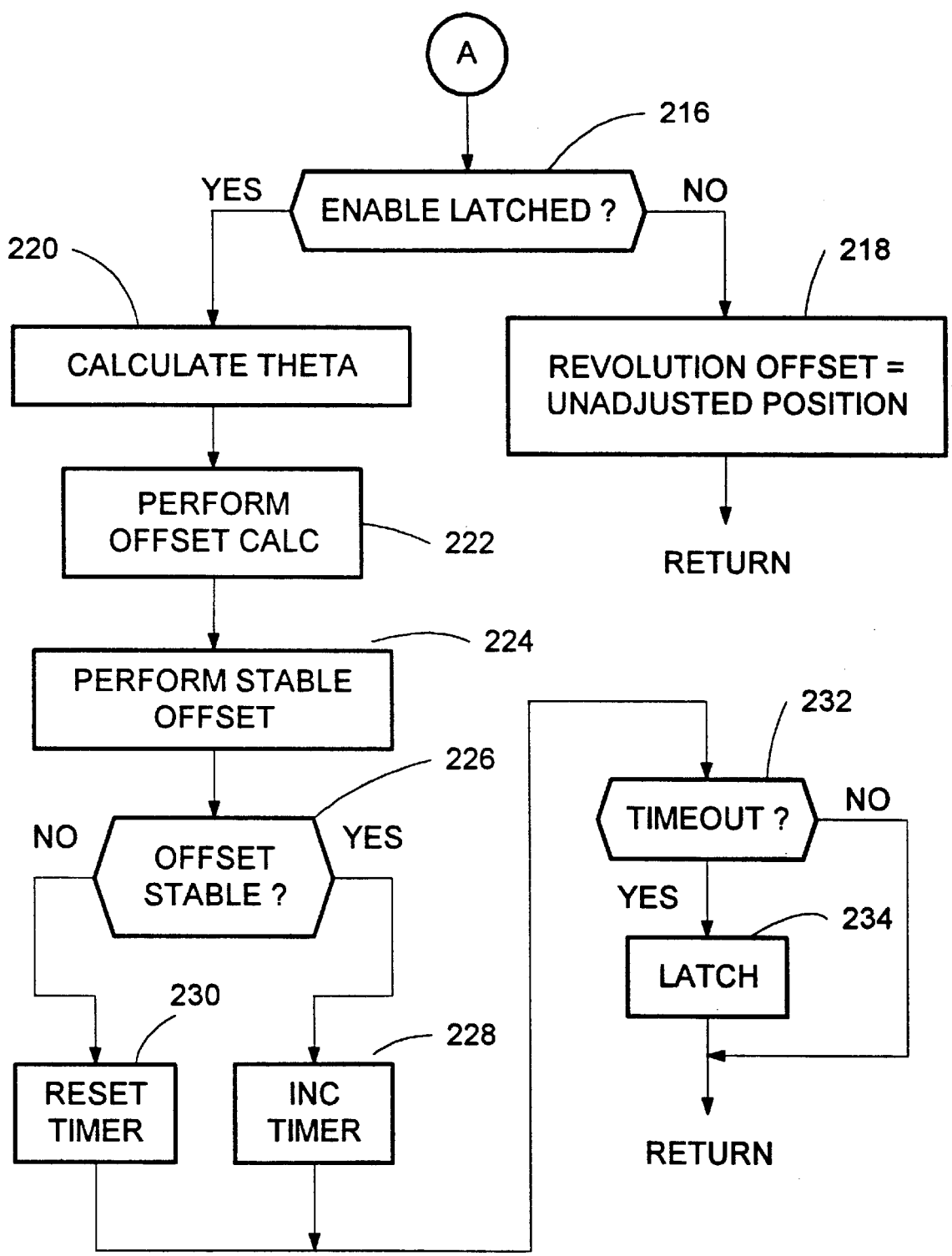
Figure 9:
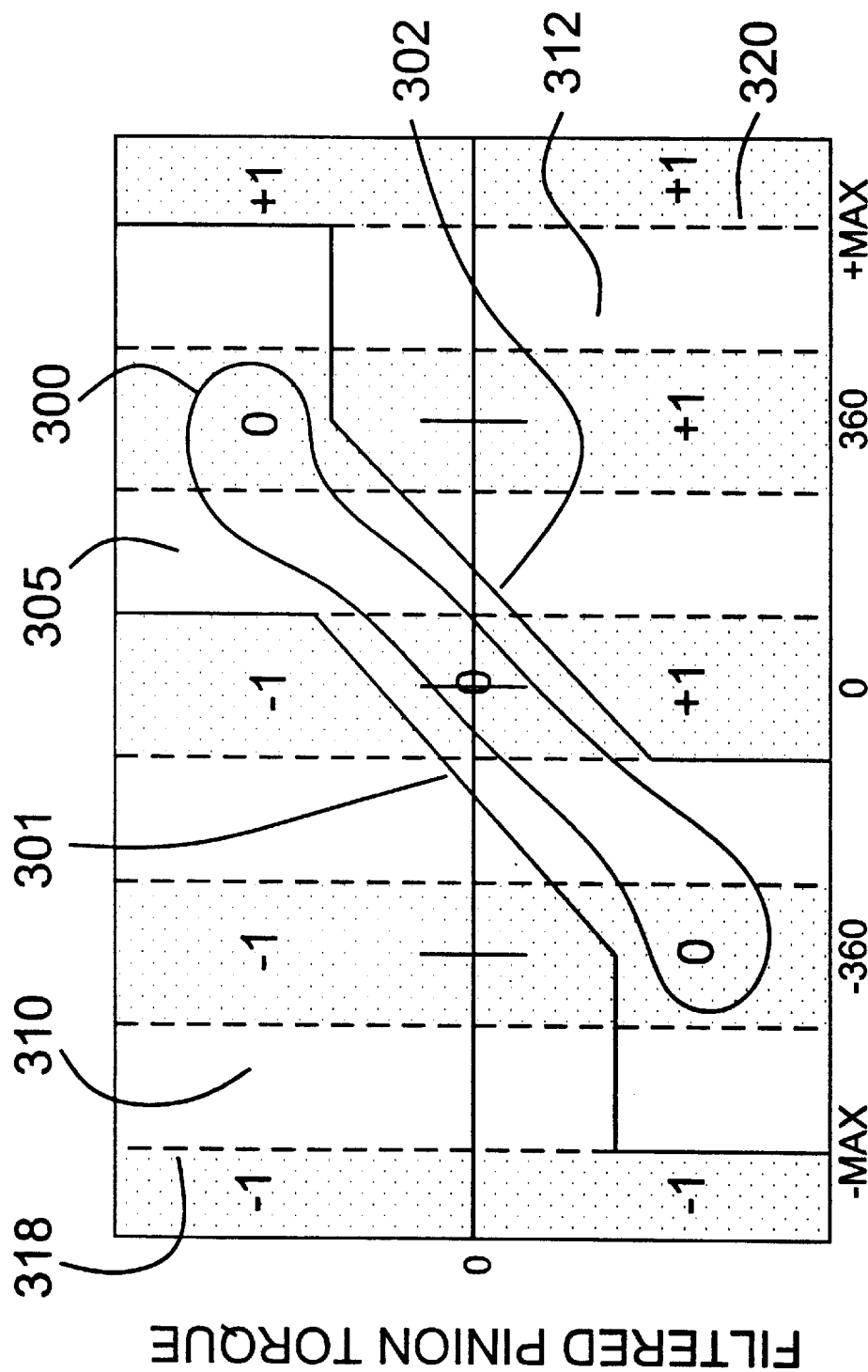
FIG. 9 shows a graphical representation of pinion torque as a function of steering position with regions of likely and unlikely operation of the power steering system of FIG. 1.

Subroutine TEST is shown in the flow charts of FIG. 6A–6B, with reference to additional flow charts 10 and 11 and the graph of FIG. 9. This method is based on the dynamics of the vehicle and steering system. FIG. 9 shows a plot 300 of pinion (total steering) torque as a function of a variable THETA indicating handwheel position at a single vehicle speed. The plot is in the form of a loop, due to hysteresis; but it shows a general increase in pinion torque with handwheel rotation in either direction from a center position. The size and shape of this plot will vary with vehicle speed, resulting in a general decrease, with increasing vehicle speed, of the amount of handwheel rotation required to produce a given level of pinion torque. If vehicle speed and pinion torque are known, there is a range of hand wheel position which is likely and two other ranges of hand wheel position which is impossible or unlikely. FIG. 9 superimposes plot 300 on a two dimensional map of steering system operating points, with each point corresponding to paired values of total steering torque and steering position. The map is divided by lines 301 and 302 into three regions: a central region 305 where the operating point is highly likely given an absolute position corresponding to THETA, a region 310 to the left of region 305 where such an operating point is highly unlikely and which suggests a decrease in the Revolution Index, and a region 312 to the right of region 305 where such an operating point is highly unlikely and which suggests an increase in the Revolution Index. This embodiment provides a usable Index by (1) dividing the total space of pinion torque vs. handwheel position at a sensed vehicle speed into such areas of likely and unlikely operation, (2) determining, in the case of unlikely operation, which direction to increment the value of the Revolution Index from the specific region into which the present operating point falls. It continues to search for a final Revolution Offset by adjusting the Index value, and thus the value of Revolution Offset, toward a likely region until the Index stabilizes.

Referring to FIG. 6A, the first step of subroutine TEST is to derive certain enable parameters at 200. These parameters include a Filtered Pinion Torque. Pinion or total steering torque is the sum of the handwheel torque supplied by the vehicle operator, which is sensed by torque sensor 28, and the assist torque, which is available in controller 16 in the form of a commanded motor current. The latter and the handwheel torque are scaled for direct addition and summed to form the pinion torque, which is then run through a noise reducing low pass filter routine (e.g., one pole, 5 Hz) to produce Filtered Pinion Torque. The value of Unadjusted Position is then identically filtered to maintain a correct phase relationship with the Filtered Pinion Torque. The vehicle velocity is obtained from suitable sensing apparatus and the handwheel velocity may be derived in any known manner, such as by differentiating the unadjusted position. Next, certain calibrations are determined at 202 by consulting a lookup table in which the values are as a function of vehicle velocity. These calibrations define lines 301 and 302, as described above, which separate the area of highly likely operation from the flanking areas of unlikely operation on the steering torque/position map; and they may include other vehicle velocity related parameters as described herein.

Once the enable parameters and calibrations are determined, certain enable conditions are tested at 204 to see if a usable Index can be determined. The basic condition that must be met is that the vehicle velocity must be above a minimum value VVMIN. As previously described, this test method is based on determining likely and unlikely areas of operation in the torque/position plane; and the curve of torque as a function of position varies significantly with vehicle velocity. The plot 300 of pinion torque vs. handwheel position varies with vehicle velocity, becoming smaller and more narrowly defined as vehicle velocity increases. In broad terms, as vehicle velocity increases the likely range of handwheel positions narrows. At very low vehicle velocities, the plot is generally unusable for purposes of this embodiment, but at very high vehicle velocities, the probability of discovering the correct Index becomes high. If the method of this embodiment is used at a vehicle velocity which is too low, the results may not be sufficiently trustworthy; but if one waits for a very high vehicle velocity one may, depending on the nature of the driving, have to wait for a comparatively long time before the condition is met. An intermediate vehicle velocity (e.g. 25 KPH) is calibrated to produce the best balance between the competing criteria of confidence and time and stored in the control. The control compares the vehicle velocity with this stored value VVMIN to determine if the first enable condition is met.

Another condition that must be met in this embodiment is that handwheel velocity must be below a maximum value HWVMAX. Plot 300 of pinion torque vs. handwheel position also varies significantly with handwheel velocity. To limit the number of stored values and calibrations, a band of handwheel velocities is chosen—preferably zero up to HWVMAX, since this is where vehicle operators, on the average, spend most of the time—and the value of HWVMAX is stored in the control. If computer capacity were large and peak performance were desired, the handwheel velocity question could be converted from an enable test to a calibration process by storing a plurality of calibration tables as a function of handwheel velocity. In this embodiment, however, the additional benefit is not considered worthwhile. The value of handwheel velocity is compared with the stored value HWVMAX; and, if it is not greater, another enable condition is met.

Other enable conditions are optional. For example, either vehicle acceleration or handwheel acceleration are possible enable parameters, with either required to be less than a maximum acceleration value; but neither is used in this embodiment. Later in this description, yet another optional enable condition will be described. In this embodiment, however, the vehicle velocity and handwheel velocity requirements described above complete the enable conditions. If both are met, an ENABLE flag is set; if either is not met, the ENABLE flag is reset.

The ENABLE flag is checked at 206. If it is set, which means all enable conditions have been met, a number COUNT1, initialized at zero, is incremented at 208. Alternatively, if all enable conditions have not been met and the ENABLE flag is reset, the value of COUNT1 is reset to zero at 210. COUNT1 is tested at 212; and, when it reaches a predetermined value ENL, enable is latched at 214. This requires the enable conditions to have been present for a predetermined period determined by ENL, the latter being calibrated for any positive, non-zero integer, including one (1). Once enable is latched, derivation of a usable Index may proceed; and a LATCH ENABLE flag is thus set, which remains set for the remainder of the ignition period. The LATCH ENABLE flag provides memory that enable has been latched, even if in some future cycles the enable conditions are absent, so that Return Torque will not come and go with the enable conditions during vehicle operation; and, after it is set, COUNT1 serves no further purpose.

At 216 (FIG. 6B), the latch enable flag is checked. If it is not set, then the vehicle dynamic conditions have not yet been met and no usable Index can be derived. Thus, Revolution Offset is given a temporary value at 218; and subroutine TEST is exited. In this embodiment, the Revolution Offset is made equal to the Unadjusted Position. Thus, when the program next returns from subroutine TEST and calculates Absolute Position, its value will be zero, regardless of the sensor output. This is a convenient way of preventing the provision of Return Torque, since it "fools" the torque determining part of the algorithm into considering the steering wheels 42 to be centered. However, if other information is available which, in the opinion of the system designer, will provide a usable temporary return torque value, it could be introduced in step 218 instead.

But from 216, if the latch enable flag is set (enable is latched), then the subroutine will continue to attempt deriving or updating a usable Index. A value THETA is derived at 220. THETA is a local variant of Absolute Position which is used only in routine TEST and a subroutine OFFSET CALC. It is derived in a manner similar to Absolute Position, but using the filtered value of Unadjusted Position and a local variant REVV of Revolution Offset, which value is the output of subroutine OFFSET CALC:

THETA=Filtered Unadjusted Position−REVV.

This quantity THETA is used as an input, along with the filtered Pinion Torque, the ENABLE flag and Vehicle Velocity in subroutine OFFSET CALC, which is called at 222.

Figure 10:
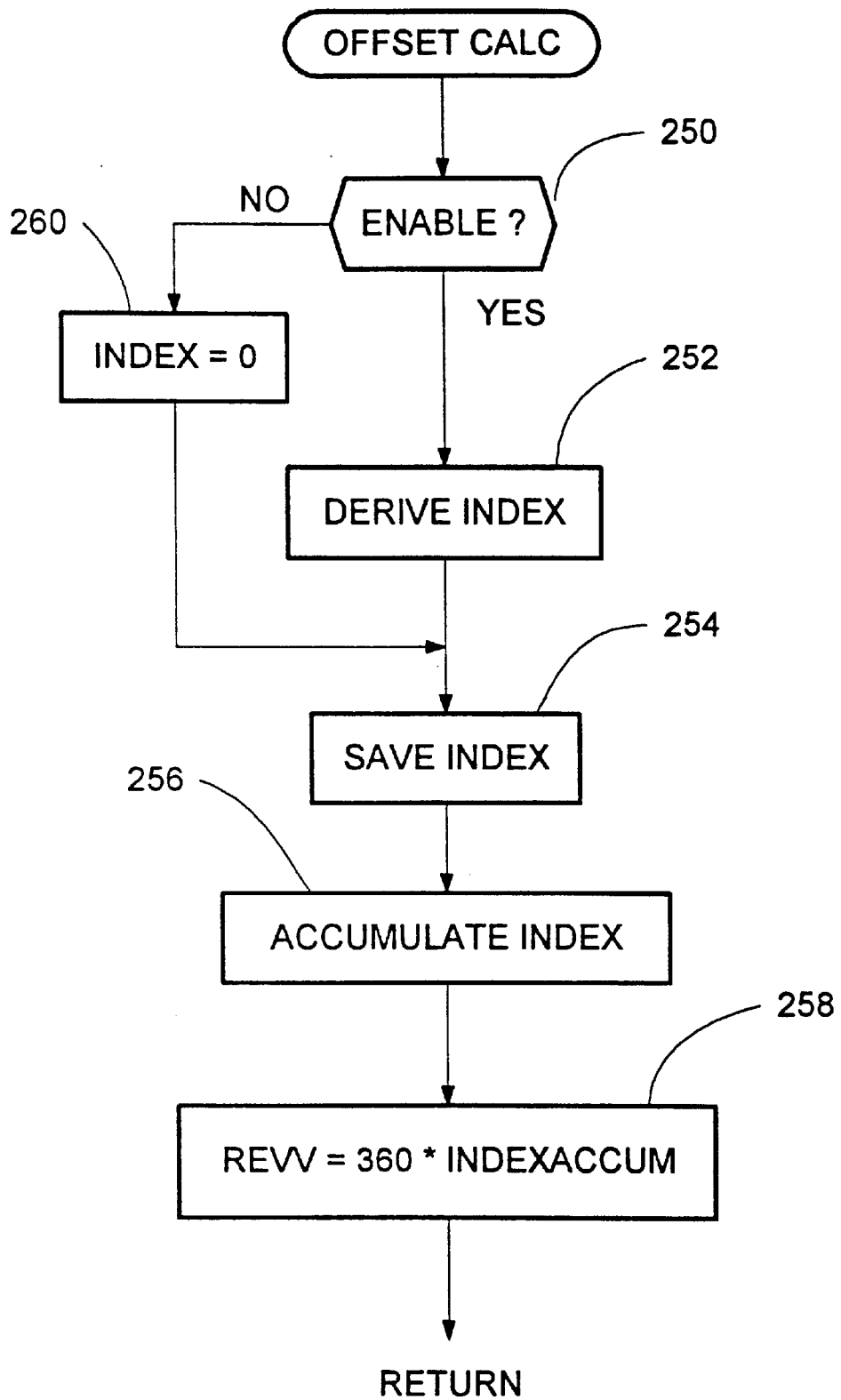
FIG. 10 shows a flow chart of a subroutine OFFSET CALC comprising part of an embodiment of the method and apparatus of this invention.

Subroutine OFFSET CALC is illustrated by the flow chart of FIG. 10. In this embodiment a "quick and simple" version of OFFSET CALC is shown to clarify the main point; a more flexible version will be described at a later point with reference to FIG. 12. Referring to FIG. 10, the subroutine begins at 250 by checking the ENABLE flag to see if the enable conditions are still met. Although this is redundant the first time the subroutine is called, in subsequent cycles, even after enable has been latched, the enable conditions may appear and disappear from time to time; and the Index derivation is only valid when the enable conditions are present.

If the ENABLE flag is set, the Revolution Index is derived at 252. The derivation of the Index is understood best with reference to FIG. 9, briefly described previously. The value of THETA and the value of Filtered Pinion Torque determine a point somewhere on the total steering torque/steering position map which represents the apparent operating point of the vehicle steering system. The location of this point is compared with lines 301 and 302, the lines being defined by mathematical statements using the calibration values derived earlier in step 202 of FIG. 6A. If the point is between lines 301 and 302, then it is likely that the apparent operating point is correct; and Index is set to zero. If the location of this point is to the left of line 301, then it is likely that the assumed THETA is too small; and REVV must be decreased to increase THETA. Thus, Index is set to −1. If the location of the point is to the right of line 302, then it is likely that the assumed THETA is too great; and REVV must be increased to decrease THETA. Thus, Index is set to +1.

The result of the Index calculation at 252 is thus +1, 0 or −1. After being saved at 254 for further use as a previous value, this value of Index is then accumulated at 256 by being added to a sum INDEXACCUM, which represents the accumulated sum of all derived values of Index since its initiation with a value of zero. Finally, at 260, subroutine OFFSET CALC multiplies INDEXACCUM by the rollover angle, 360 degrees in this embodiment, to obtain REVV, a usable value of Revolution Offset. Thus, in each cycle in which the enable conditions are satisfied, a value of Index is derived based on the possibility of the indicated combination of pinion torque and handwheel position (steering position). This value is accumulated with prior values; and an offset value REVV, derived from the accumulated value INDEXACCUM, is subtracted from the filtered handwheel position in the next updating of THETA (step 220, FIG. 6B) to shift the vehicle dynamic point used for Index calculation toward the center of the map. Thus, starting from zero, the value of Index will be advanced incrementally in a positive or negative direction, shifting the vehicle dynamic point by one Revolution Offset at a time toward lines defined by the calibration values, until the point arrives between the lines where the Index is zero. Since nothing additional is accumulated while the Index is zero, REVV ordinarily will not change further.

It should be noted that the +1 and −1 designations in the map of FIG. 9 are not bounded by the right and left borders of the map as shown but extend a far as required. In this embodiment, all points to the right of line 302 or to the left of line 301 result in a change in Index of one unit. It might be possible to speed the process of finding the final Index by providing a larger absolute value of Index in subroutine OFFSET CALC for very large absolute values of THETA: e.g. values having absolute values greater than MAX. In such case, points to the left of dashed line 318 or to the right of dashed line 320 in FIG. 9 would result in Indexes of −2 and +2, respectively.

Figure 11:
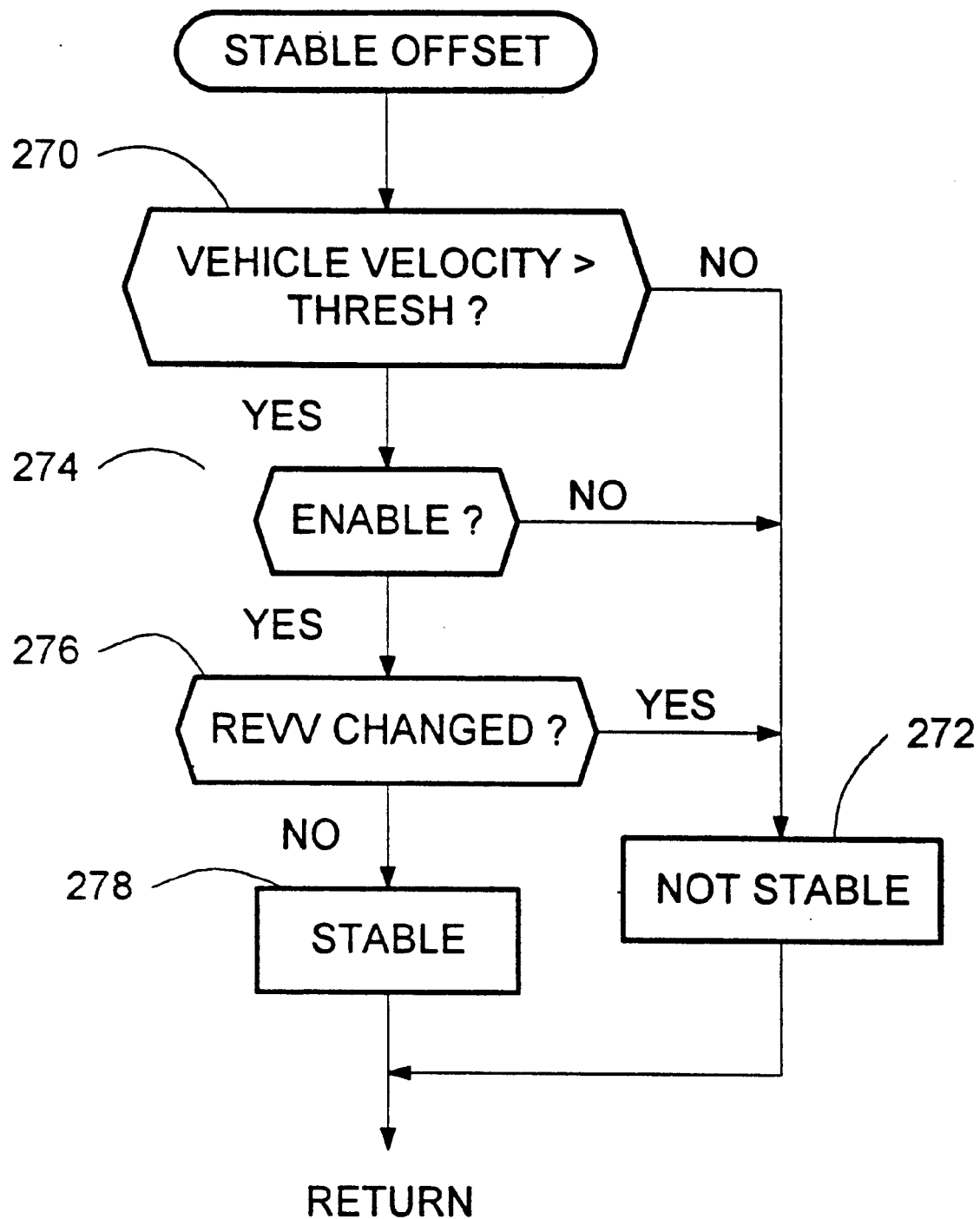
FIG. 11 shows a flow chart of a subroutine STABLE OFFSET comprising part of an embodiment of the method and apparatus of this invention.

Returning to FIG. 6B, after performing subroutine OFFSET CALC, a subroutine STABLE OFFSET is performed at 224. The purpose of this subroutine is to determine if the value of REVV has stabilized to the point that it appears likely the true value of Revolution Offset. If so, it will be latched as the final value. Referring to FIG. 11, subroutine STABLE OFFSET tests for three stability conditions. At 270, it compares vehicle velocity with a threshold value THRESH, which is a higher value than the minimum vehicle velocity used in the enable conditions. If the actual vehicle velocity is not greater, a STABLE flag is reset at 272 to indicate NOT STABLE and the subroutine is exited. Next, the ENABLE flag is checked at 274. If it is not set, the STABLE flag is reset at 272 to indicate NOT STABLE; and the subroutine is exited. Finally, the present value of REVV is compared at 276 with a saved previous value. If it has changed, the STABLE flag is reset at 272 to indicate NOT STABLE; and the subroutine is exited. But if it is the same, all stability conditions have been met; and the STABLE flag is set at 278 before the subroutine is exited.

After return from subroutine STABLE OFFSET at 224, the STABLE flag is checked at 226. If it is set, a timer is incremented at 228; if it is not set, the timer is reset at 230. Time-out is checked at 232. If the timer has not timed out, the subroutine is exited; but if the timer has timed out, the LATCH flag is set before the subroutine is exited.

Figure 12:
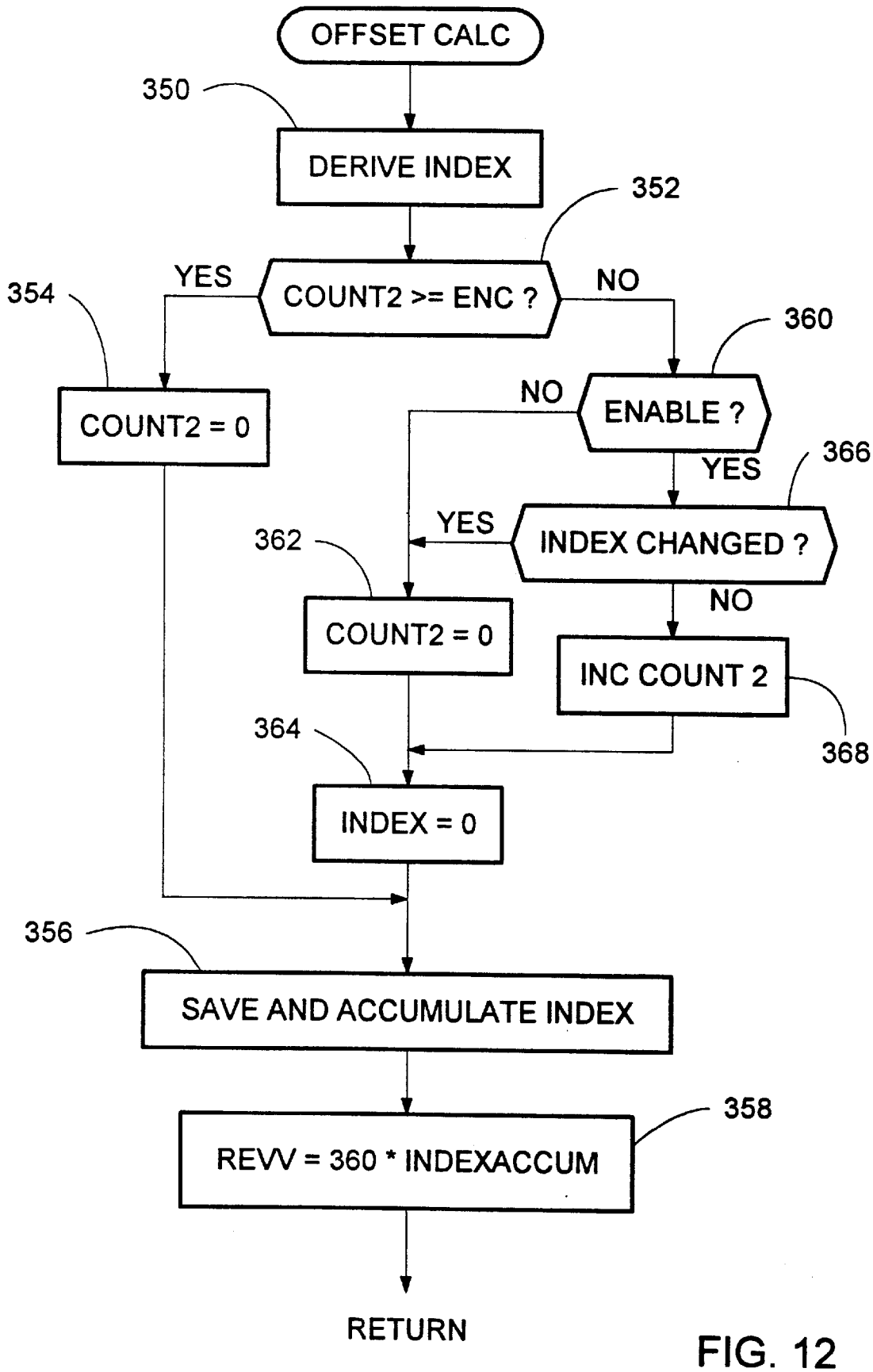
FIG. 12 shows a flow chart of a variation of subroutine OFFSET CALC comprising part of another embodiment of the method and apparatus of this invention.

A variation of subroutine OFFSET CALC is shown in FIG. 12. This version includes an internal "mini-stability" function which might enhance operation of some power steering systems. The subroutine begins by deriving a Revolution Index at 350. The derivation of the Index is the same as that described with respect to step 252 of FIG. 10 and the map of FIG. 9, both described previously. Next, at 352, a COUNT2 is compared with a reference ENC. If it is greater than or equal to ENC, COUNT2 is reset to zero at 354; and the derived Index is saved and accumulated at 356. The accumulated sum INDEXACCUM is multiplied by the rollover angle (360 degrees) at 358 to provide REVV for the updating of THETA. In order to ensure that this occurs on the cycle when enable is first latched, the value of COUNT2 can be pre-loaded with ENC in initialization.

If COUNT2 is less than ENC at 352, the ENABLE flag is checked at 360. If it is not set, the first "mini-stability" condition fails. COUNT2 is reset to zero at 362; and Index is set to zero at 364 to be saved and accumulated at 356. If the ENABLE flag is set at 360, the value of Index derived at 350 is checked with a previous value to determine if it has changed. If it has changed, the second "mini-stability" condition fails; and the subroutine proceeds to step 362 with further action as already described. But if the Index has not changed at 366, both "mini-stability" conditions are satisfied; and COUNT2 is incremented at 368 before Index is set to zero at 364. Thus, a derived Index is not saved and accumulated every cycle in which the enable conditions are satisfied but when they have been satisfied for a predetermined number ENC of consecutive cycles.

In this method and apparatus, when a usable Index is first found or updated, a value of Revolution Offset could be derived from the new Index and used to derive Absolute Position and Return Torque. But if controller 16 suddenly changes the Revolution Offset, the Return Torque may undergo a sudden increase which the vehicle operator will feel through the handwheel. Even if the initial assumption of the sensor output being on line 90 of FIG. 3 was correct, in this embodiment the value of Revolution Offset has not been zero but, as described above, has been set equal to Unadjusted Position to produce zero Return Torque. Thus, the first usable Revolution Index as well as many updated Revolution Indexes, if used immediately, will produce an undesirable sudden increase in Return Torque. The desired Return Torque is preferably phased in slowly and smoothly; and this is accomplished by a subroutine WALK, which is called at step 114 of FIG. 5 before Absolute Position is calculated at 116.

Figure 7:
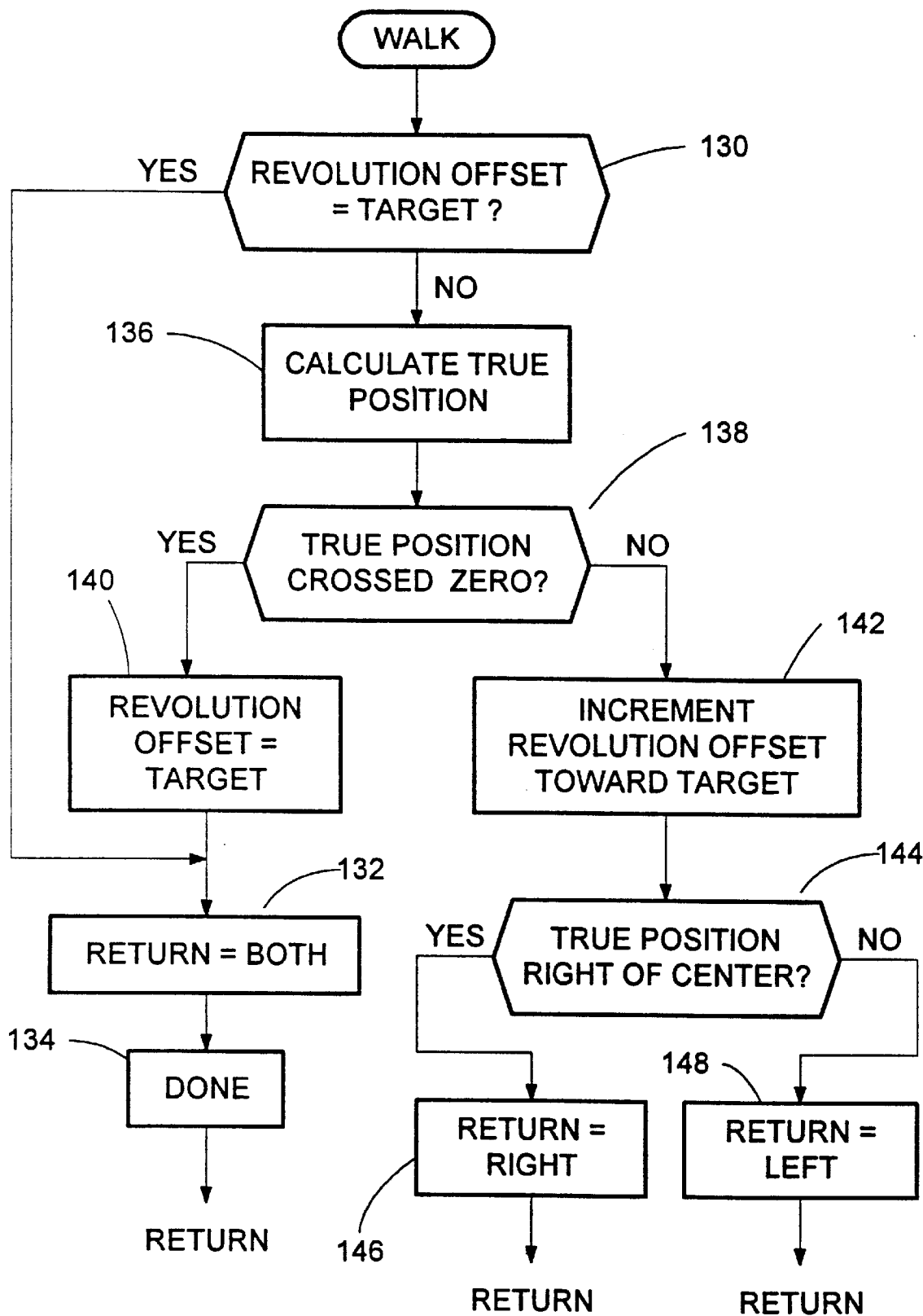
FIG. 7 shows a flow chart of a subroutine WALK comprising part of an embodiment of the method and apparatus of this invention.

Subroutine WALK is described by the flow chart of FIG. 7. The subroutine essentially "walks" the value of Revolution Offset in incremental steps from the value being used at the time a usable or new value of Revolution Offset Index is derived toward the target value corresponding to the derived Revolution Offset Index until the first of the following to occur: (1) the target value of Revolution Offset is reached, or (2) a true center position is reached. During this "walk," a Return Torque is derived based on the Absolute Position calculated from the walking value of Revolution Offset; but it is used only if it would actually provide a Return Torque in the direction of the center position.

Figure 8:
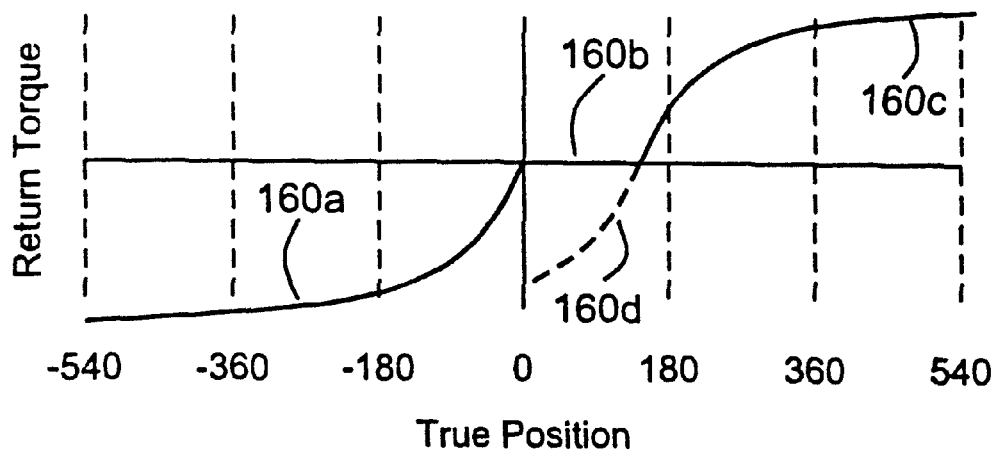
FIG. 8 shows a graphical representation of desired return torque as a function of true position useful in illustrating an example of the operation of the method and apparatus of this invention.

This may be demonstrated with reference to FIG. 8, in which solid line 160a–160c shows the desired return torque as a function of True Position for a specific example in which a last remaining Revolution Index of zero is latched at a time when the Unadjusted Position is +144 degrees and the Revolution Offset is thus also +144 degrees. The True Position is the value of Absolute Position corresponding to the targeted Revolution Offset: a value associated with the present usable value of Index. The word "true" is used in comparison with the Absolute Position, which is derived during the walk to provide an intended steering "feel" and does not actually represent a true steering position until the walk has ended.

It is not desirable to immediately replace the Revolution Offset value of +144 degrees with the target value of zero, since this would produce a sudden jump in Return Torque. Left portion 160a of line 160a–160c shows a normal Return Torque from the left. Right portion 160c shows the Return Torque from the right, starting with zero at the present True Position of +144 degrees. Center portion 160b is a straight horizontal line at zero torque between a True Position of zero and the present True Position of +144 degrees. The action of subroutine WALK is to incrementally move right portion 160c toward center, thus incrementally shortening center portion 160b, until the latter disappears and right portion 160c meets left portion 160 at a True Position of zero. This would represent the first condition for the end of the walk as stated above.

It must be kept in mind that the walk, and thus the movement of right portion 160c to the left, proceeds slowly and steadily under software control; but the steering system, and thus the Absolute Position, may be moved independently by the vehicle driver in either direction and over a wide range of speeds while the walk is taking place. The vehicle driver may, for example, move the steering system to the left at a faster rate than that of the walk. If so, the Unadjusted Position will become less than the Revolution Offset, and the Absolute Position determined at step 116 of FIG. 5 will become negative. The Return Torque derived in step 118 of FIG. 5 will also become negative and thus directed toward the right. This is demonstrated in the dashed line extension 160d of line 160c to the left into the negative torque region below the horizontal axis. The torque thus called for would be in the wrong direction; and, as will be described, subroutine WALK prevents such Return Torque from being applied, as indicated by the solid horizontal center portion 160b at zero Return Torque.

But if the fast movement of the steering system to the left continues, it may reach center (zero degrees) before Revolution Offset (and thus the left end of solid left portion 160c). In this case, or in the case where the steering system is returned to center from the left, the Return Torque will be zero—precisely what it should be at center. There is no reason why the walk should not be cut short and the target value IND * 360 of Revolution Offset immediately substituted for the temporary value being used at the time, since no sudden change in Return Torque will occur. This is the second condition for ending the walk as stated above. Since driving maneuvers generally end with the driver straightening the handwheel, even a slowly calibrated walk can be quickly ended with this criteria.

Referring to FIG. 7, subroutine WALK begins with the present value of Revolution Offset being compared in step 130 with the target value, which is the product of the present usable Index and the rollover angle, in this embodiment 360 degrees:

Target Revolution Offset=Usable Index * 360.

If the values are equal, the target value has been reached, and the walking is finished: this is the first test for the end of the walk as described above. Return Torque is authorized in both directions at step 132, since there is now no region in which the derived Return Torque may be in the wrong direction (center portion 160b in FIG. 8 has shrunk to nothing). The DONE flag is set at step 134, and the program returns from subroutine WALK, calculates the Absolute Position at step 116 and derives the corresponding Return Torque at step 118 of FIG. 5. On all subsequent cycles of the RETURN TORQUE routine until the vehicle ignition is turned off (or until an error is detected by optional apparatus not described herein), the DONE flag consulted at step 108 will cause subroutines TEST and WALK to be skipped. However, this is unlikely to occur in the first cycles of the routine.

If the present value of Revolution Offset has not reached the target value at step 130, the True Position is calculated at step 136. The True Position is the value of Absolute Position corresponding to the target value of Revolution Offset, derived from the usable Index, with the walk finished:

True Position=Unadjusted Position–Target Offset.

The value of True Position is examined at step 138; and, if it is zero, or if it has changed sign signifying that it has crossed zero, the second condition for the end of the walk has been met. It is preferred in this test for the end of walk to check both for True Position=zero and for True Position having crossed zero, since the motion of the steering system under vehicle driver control is unpredictable and potentially fast, so that a position of zero may be skipped between two sensor readings. This is in contrast to the first test for the end of walk, in which the incremental changes in Revolution Offset during the walk are completely under software control and may be forced to equal zero precisely when it is reached. In some embodiments, however, either or both tests may be expressed as whether the value being tested is within a predetermined distance of zero, since a small sudden change in Return Torque produced by a non-zero Absolute Position within the predetermined range about zero may be essentially negligible.

If True Position is found at 138 to have reached or crossed zero, the walk is ended with Revolution Offset being set equal to the Target at 140, Return Torque being authorized from both directions at 132 and the DONE flag set at 134 as previously described, with the DONE flag preventing further repetitions of the TEST or WALK subroutines.

But if True Position has not reached or crossed zero, the walk continues as the value of Revolution Offset is incremented toward the target value at 142. The sign of True Position is checked to see if it is to the right of center at 144. If it is, Return Torque from the right only is authorized at 146; and negative values such as those indicated in dashed line 160d of FIG. 8 will not be provided. If not, Return Torque from the left only is authorized at 148. Thus, the range of Return Torque indicated by line 160a–160c will be provided to motor 46 during the walk. Subroutine WALK is then exited; and Absolute Position is calculated at 116 of FIG. 5 using the incremented value of Revolution Offset. The WALK subroutine will continue to be called from routine RETURN TORQUE, with Return Torque provided or not as described above, until one of the conditions for the end of the walk is met and the DONE flag set, after which no further testing or walking is done for the remainder of the ignition cycle.

Figure 13A:
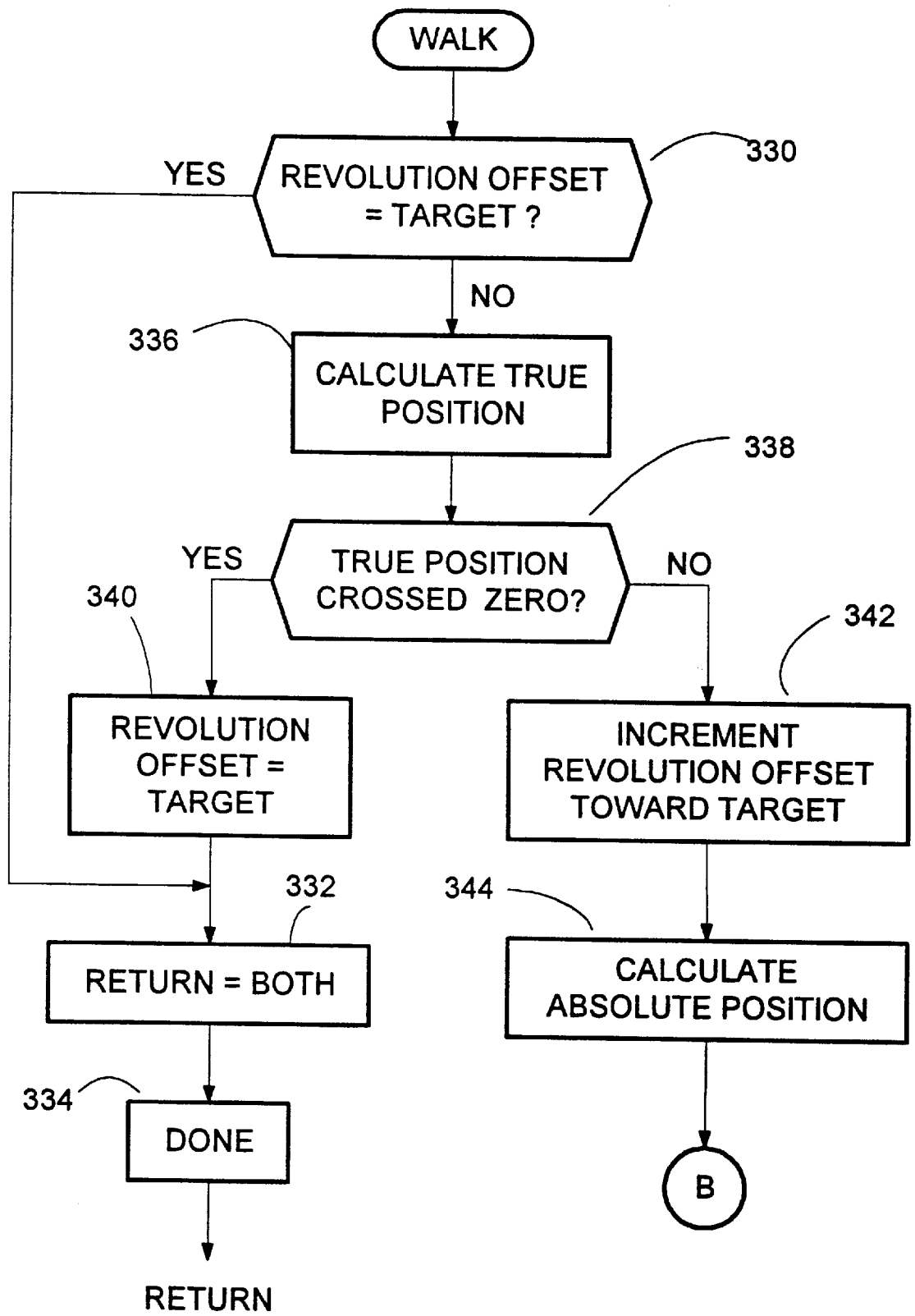
FIG. 13A and 13B show a flow chart of a variation of subroutine WALK comprising part of another embodiment of the method and apparatus of this invention.
Figure 13B:
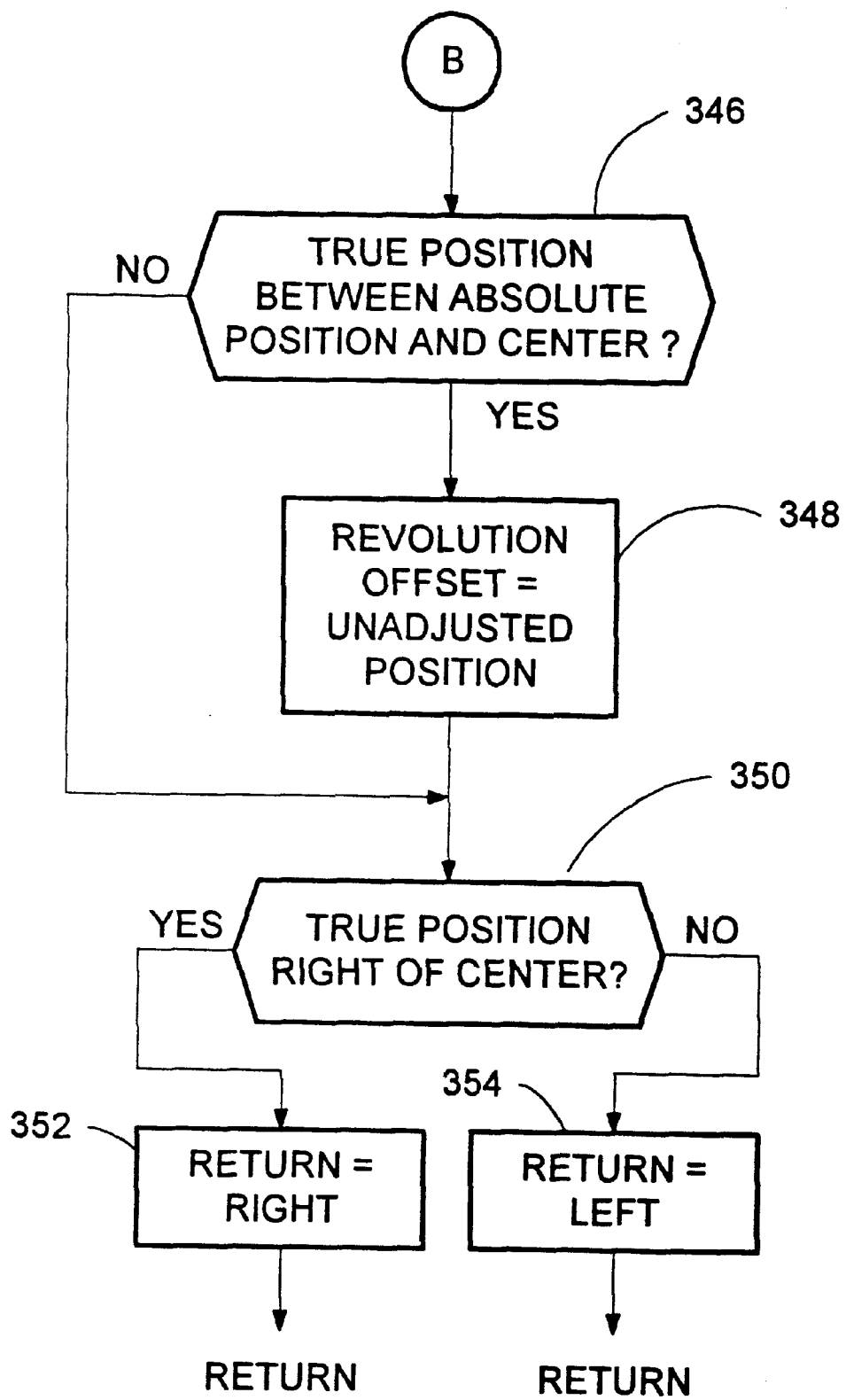

An alternative subroutine WALK is shown in FIG. 13A and 13B. This version of WALK provides an additional way to shorten the time required for the walk. Steps 330–342 are identical with the similarly numbered steps 230–243 in FIG. 7. But even if the first and second conditions have not ended the walk, there is still a possibility that the walk can be shortened. If the vehicle handwheel has been turned in the direction of center faster than the walk has proceeded, the True Position might be closer to center than the Absolute Position and on the same side. With reference to FIG. 8, the Absolute Position is in the range of dashed line 160*d*. Since the final steps 350–354 of this subroutine will not authorize return torque in this area, no return torque will be provided; and operation will actually be along line 160*b*. But zero Return Torque will be provided for any value of Revolution Offset as it moves to the left until it passes the value of Absolute Position. Therefore, under these circumstances Revolution Offset may be jumped immediately to the present value of Absolute Position, which will be closer to the Target value, without introducing any sudden increase in return torque. The Absolute Position is calculated at 344. At 346 (FIG. 13B), the subroutine determines if True Position is between Absolute Position and center. This can be accomplished by comparing the sign of Absolute Position with the sign of True Position. If the signs are opposite, then True Position is between Absolute Position and center, and Revolution Offset is set equal to Absolute Position at 348. If their signs are the same, then True Position is not between Absolute Position and center, and the subroutine does not change Revolution Offset. The subroutine then proceeds to the group of steps 350–354, which determine whether left or right return is enabled, in a manner identical to steps 144–148 of FIG. 7.

A variation in the embodiment described adds an additional enable criterion to those described in step 204 of FIG. 6A. Referring to FIG. 9, plot 300 of pinion torque vs. steering position can vary from the shape and size shown. In some cases, such a plot could overlap part of itself shifted along the position (THETA) axis by the rollover angle, especially for a rollover angle of 180 degrees or less. A point that fell on such an overlap would provide an ambiguous indication of the Index. To avoid such a result, data corresponding to such positions may be ignored. Another reason for ignoring data in some parts of the map is to prevent false results in areas of the map where the date is inherently unreliable, due to modes of vehicle operation where the vehicle dynamics relationships exploited by this method and apparatus do not apply. An example of such a mode of operation is a vehicle sliding on a slippery surface. A sliding vehicle can assume almost any steering position without generating much steering torque; and it is desirable to avoid using data from areas of the map that could only result from such a mode of operation.

To provide such data ignoring capability, one may provide vertical bands of good data on each side of center and each multiple of the rollover angle in both directions along the position (THETA) axis. In FIG. 9, these bands are shown with a patterned background between dashed lines at −360, 0 and +360 degrees, as well as to the right of dashed line 320 at +MAX and the left of dashed line 318 at −MAX (MAX being the absolute value of the maximum rack travel from center). The width of the bands is one of the calibrations determined in step 202 of FIG. 6A. In step 204, an additional enable condition is that the value of THETA is within one of these bands. If it is not, enable fails at 206. An additional such band or bands, not shown in FIG. 9, may be drawn horizontally about predetermined values of Filtered Pinion Torque, with a similar enable test performed with respect to the derived value of Filtered Pinion Torque. The result, if both tests were added to the enable criteria, would be smaller, rectangular areas of enabling data. The decision of whether or not to use these additional criteria requires a balance of their benefit in stabilizing the Index testing process versus the additional delay produced by ignoring data.

What is claimed is:

1. A method for producing a desired return torque in a vehicle power steering system having a steering position varying through a total range about a center position, the vehicle power steering system having a steering shaft with an actuator coupled thereto for the provision of return torque and a rotational position sensor providing an output signal varying between a minimum value and a maximum value with consecutive rotations of the steering shaft through a rollover angle, whereby rollover transitions are generated between such consecutive rotations, the total range of the steering position being greater than a single rollover angle so that each output of the rotational position sensor indicates a plurality of potential steering positions separated from each other by integer multiples of the rollover angle, the method comprising:

upon initiation of vehicle operation, initially choosing an unadjusted steering position from the plurality of potential steering positions corresponding to a sensed initial output of the rotational position sensor, and thereafter updating the unadjusted steering position in response to output changes of the rotational position sensor, including compensation for sensed rollover transitions, so that the unadjusted steering position varies continuously over the total range of the steering position;

for a predetermined range of vehicle velocities above and including a minimum vehicle velocity, and for a two dimensional range of possible vehicle steering operating points defined by total steering torque and steering position, storing data defining a first region of likely vehicle steering system operating points, a second region of unlikely steering system operating points indicating a revolution offset in a first direction, and a third region of unlikely steering system operating points indicating a revolution offset in an opposite direction;

until vehicle velocity first equals the minimum vehicle velocity, providing a first return torque command to the actuator to produce a predetermined first return torque;

when vehicle velocity equals the minimum vehicle velocity for at least a predetermined time, deriving a vehicle steering operating point from a sensed total steering torque, the updated unadjusted steering position and a revolution offset, comparing the derived vehicle steering operating point with the stored data and updating the revolution offset by a step equal to the rollover angle if the derived vehicle steering system operating point is within the second stored region or the third stored region of steering system operating points; and after the revolution offset is updated, deriving a second return torque command from the updated unadjusted steering position and updated revolution offset and providing the second return torque command to the actuator to produce a second return torque.

2. The method of claim 1 in which the steps of deriving a vehicle steering operating point and comparing the derived vehicle steering operating point with the stored data and updating the revolution offset are repeated, while predetermined enabling criteria are satisfied.

3. The method of claim 2 in which the steps of deriving a vehicle steering operating point and comparing the derived vehicle steering operating point with the stored data and updating the revolution offset are discontinued when the updated revolution offset stabilizes according to predetermined stabilization criteria.

4. The method of claim 2 in which the enabling criteria comprise a minimum vehicle velocity.

5. The method of claim 2 in which the vehicle steering system has a handwheel for vehicle operator control and the enabling criteria comprise a maximum handwheel velocity.

6. The method of claim 4 in which the vehicle steering system has a handwheel for vehicle operator control and the enabling criteria also comprise a maximum handwheel velocity.

7. The method of claim 2 in which one or more portions of the two dimensional range of possible vehicle steering operating points are excluded to improve reliability of the updating of the revolution offset based on location of the derived steering system operating point within the first stored region, the second stored region or the third stored region.

8. The method of claim 1 in which the first return torque command is derived from an initial revolution offset and the unadjusted steering position but, when the revolution offset is updated, the updated revolution offset is set as a target and the first return torque command is derived from the unadjusted steering position and a temporary revolution offset advancing incrementally from the initial revolution offset toward the target and provided to the actuator when it produces return torque in a correct direction.

9. The method of claim 8 in which, while the temporary revolution offset is in use, use of the first torque command is allowed in only a single direction chosen to provide centering of the power steering system as determined in response to a true steering position, derived from the target and the updated unadjusted steering position.

10. The method of claim 8 in which the second return torque command is derived from the unadjusted steering position and the updated revolution offset when the temporary revolution offset arrives within a first predetermined small distance of the target.

11. The method of claim 8 in which the second return torque command is derived from the unadjusted steering position and the updated revolution offset when a true steering position, derived from the target and the updated unadjusted steering position, arrives within a second predetermined small distance of the center position.

12. The method of claim 8 in which the second return torque command is derived from the unadjusted steering position and the updated revolution offset when a true steering position, derived from the target and the updated unadjusted steering position, crosses the center position.

13. A vehicle power steering system comprising, in combination:

a rotational steering member controlling the attitudinal direction of a vehicle steering wheel through steering apparatus having a steering position varying through a total range about a center position;

a steering shaft with an actuator coupled thereto for the provision of return torque and a rotational position sensor providing an output signal varying between a minimum value and a maximum value with consecutive rotations of the steering shaft through a rollover angle, whereby rollover transitions are generated between such consecutive rotations, the total range of the steering position being greater than a single rollover angle so that each output of the rotational position sensor indicates a plurality of potential steering positions separated from each other by integer multiples of the rollover angle;

first means effective upon initiation of vehicle operation for initially choosing an unadjusted steering position from the plurality of potential steering positions corresponding to a sensed initial output of the rotational position sensor and thereafter updating the unadjusted steering position in response to output changes of the rotational position sensor, including compensation for sensed rollover transitions, so that the unadjusted steering position varies continuously over the total range of the steering position;

second means effective, over a predetermined range of vehicle velocities above and including a minimum vehicle velocity, and for a two dimensional range of possible vehicle steering operating points defined by total steering torque and steering position, for storing data defining a first region of likely vehicle steering system operating points, a second region of unlikely steering system operating points indicating a revolution offset in a first direction, and a third region of unlikely steering system operating points indicating a revolution offset in an opposite direction;

third means effective until vehicle velocity first equals the minimum vehicle velocity for providing a first return torque command to the actuator to produce a predetermined first return torque;

fourth means effective, when vehicle velocity equals the minimum vehicle velocity for at least a predetermined time, for deriving a vehicle steering operating point from a sensed total steering torque, the updated unadjusted steering position and a revolution offset, comparing the derived vehicle steering operating point with the stored data and updating the revolution offset by a step equal to the rollover angle if the derived vehicle steering system operating point is within the second stored region or the third stored region of steering system operating points; and fifth means effective, after the revolution offset is updated, for deriving a second return torque command from the updated unadjusted steering position and updated revolution offset and providing the second return torque command to the actuator to produce a second return torque.

14. The vehicle power steering system of claim 13 in which the fourth means is effective to repeatedly derive the vehicle steering operating point, compare the derived vehicle steering operating point with the stored data and update the revolution offset while predetermined enabling criteria are satisfied.

15. The vehicle power steering system of claim 13 in which the fourth means ceases deriving a vehicle steering operating point, comparing the derived vehicle steering operating point with the stored data and updating the revolution offset when the updated revolution offset stabilizes according to predetermined stabilization criteria.

16. The vehicle power steering system of claim 14 in which the enabling criteria comprise a minimum vehicle velocity.

17. The vehicle power steering system of claim 14 in which the vehicle steering system has a handwheel for vehicle operator control and the enabling criteria comprise a maximum handwheel velocity.

18. The vehicle power steering system of claim 16 in which the vehicle steering system has a handwheel for vehicle operator control and the enabling criteria also comprise a maximum handwheel velocity.

* * * * *